US012618486B2

(12) United States Patent
Prieto

(10) Patent No.: US 12,618,486 B2
(45) Date of Patent: May 5, 2026

(54) CAM-ARM POPPET VALVE

(71) Applicant: Acorn Engineering Company, Inc.,
City of Industry, CA (US)

(72) Inventor: Luis Fernando Prieto, Chino, CA (US)

(73) Assignee: Acorn Engineering Company, Inc.,
City of Industry, CA (US)

( * ) Notice: Subject to any disclaimer, the term of this
patent is extended or adjusted under 35
U.S.C. 154(b) by 94 days.

(21) Appl. No.: 18/369,767

(22) Filed: Sep. 18, 2023

(65) Prior Publication Data
US 2024/0093794 A1      Mar. 21, 2024

Related U.S. Application Data

(60) Provisional application No. 63/407,516, filed on Sep.
16, 2022.

(51) Int. Cl.
F16K 15/02       (2006.01)
F16K 15/06       (2006.01)

(52) U.S. Cl.
CPC .......... F16K 15/028 (2013.01); F16K 15/064
(2021.08); F16K 15/065 (2021.08); *F16K
2200/30* (2021.08); *F16K 2200/302* (2021.08)

(58) Field of Classification Search
CPC .... F16K 15/026; F16K 15/028; F16K 15/063;
F16K 15/064; F16K 15/065
See application file for complete search history.

(56) References Cited

U.S. PATENT DOCUMENTS

| | | | | |
|---|---|---|---|---|
| 1,152,280 | A | 8/1915 | Boy | |
| 1,278,133 | A | 9/1918 | Gammeter | |
| 2,586,942 | A | 2/1952 | Grove | |
| 3,283,772 | A | 11/1966 | Ensign | |
| 4,357,954 | A * | 11/1982 | Hunter | F16K 15/026 137/540 |
| 4,428,398 | A * | 1/1984 | Mito | F16K 15/063 137/530 |
| 5,031,661 | A | 7/1991 | Feuz | |
| 5,913,331 | A | 6/1999 | Noll et al. | |
| 6,349,736 | B1 | 2/2002 | Dunmire | |
| 6,443,184 | B1 * | 9/2002 | Funderburk | F16K 15/066 137/535 |
| 11,231,118 | B1 | 1/2022 | Kubricky et al. | |
| 11,306,839 | B1 | 4/2022 | Anderson | |
| 11,427,992 | B2 | 8/2022 | Burke et al. | |
| 2005/0199291 | A1 | 9/2005 | Price et al. | |
| 2007/0204916 | A1 | 9/2007 | Clayton et al. | |

(Continued)

*Primary Examiner* — Kevin F Murphy
(74) *Attorney, Agent, or Firm* — The Webb Law Firm

(57)          ABSTRACT
A check valve may include: a check seat defining a flow path
and including downstream and upstream sides; a poppet
assembly including a poppet body and a poppet seat, the
poppet seat configured to form a fluid-tight seal with the
downstream side; at least one first extension extending
upstream from the poppet body and including a roller; and
at least one cam arm disposed at least partially upstream of
the poppet body and the check seat and configured to engage
with the at least one roller; and at least one cam arm disposed
at least partially upstream of the poppet body and the check
seat and configured to engage with the at least one roller.
Engagement between the at least one cam arm and the at
least one roller is configured to urge the poppet in the
upstream direction.

20 Claims, 7 Drawing Sheets

(56) References Cited

U.S. PATENT DOCUMENTS

| 2009/0250123 | A1 | 10/2009 | Matsubara et al. |
| 2016/0186872 | A1 | 6/2016 | Smith et al. |
| 2022/0260164 | A1 | 8/2022 | Clason et al. |

* cited by examiner

CAM-ARM POPPET VALVE

CROSS REFERENCE TO RELATED APPLICATIONS

This application claims priority to U.S. Provisional Patent Application Ser. No. 63/407,516, titled "Cam-Arm Poppet Valve" and filed on Sep. 16, 2022, the disclosure of which is incorporated herein in its entirety.

BACKGROUND OF THE INVENTION

Field of the Invention

This disclosure pertains to a poppet-style check valve having a cam-arm and roller arrangement displaced within the valve in order to control the flow characteristics required to open the valve.

Description of Related Art

Check valves use some variety of mechanisms and other physical characteristics to control characteristics of fluid flow within the valves and a piping system, depending on various operating parameters. Most check valves include a spring, which acts against fluid flow to hold the check in place. To open the check, fluid flow must create a pressure differential upstream and downstream of the check that is greater than the spring force. The point at which flow happens within the check valve is called the cracking pressure Check valves that only use a spring to keep the check shut lack the ability to have dynamic opening properties, meaning the check opens at a rate completely dependent on the force of the fluid flow acting against the check and its associated spring force. Thus, there is a need to have a check valve that includes dynamic opening features that allow for dynamic fluid flow control.

SUMMARY OF THE INVENTION

In some embodiments or aspects of the present disclosure, a check valve may include: a check seat defining a flow path and extending about a longitudinal axis, the check seat including a downstream side and an upstream side; a poppet assembly including a poppet body and a poppet seat, the poppet seat configured to form a fluid-tight seal with the downstream side, the poppet body being configured to obstruct the flow path; at least one first extension extending from the poppet body in an upstream direction, the at least one first extension including a roller; and at least one cam arm disposed at least partially upstream of the poppet body and the check seat, the at least one cam arm configured to engage with the at least one roller. The poppet assembly may be configured to move in a downstream direction, thereby breaking the fluid-tight seal. Engagement between the at least one cam arm and the at least one roller is configured to urge the poppet assembly in the upstream direction. When the fluid-tight seal is formed between the poppet seat and the valve seat, the poppet assembly is in the closed position, and when the fluid-tight seal is broken and the poppet assembly is moved downstream, the poppet assembly is in the open position.

The check valve may further include a connecting rod connecting the poppet assembly to the check body, the connecting rod extending through the check body; and a compression spring disposed between the connecting rod and the check seat. The connecting rod may be configured to slide within the check body as the poppet assembly moves in the downstream and upstream directions, and the compression spring may be configured to urge the poppet assembly in the upstream direction. The at least one cam arm may include a body, the body defining an elbow configured to receive the at least one roller therein when the poppet assembly is in the closed position. The body of the at least one cam arm may include a first end and a second end, and the elbow may be located between the first end and the second end. The at least one cam arm may include a sloped surface extending from the elbow in a downstream direction, and the sloped surface may be angled relative to the longitudinal axis. The angle may be such that the fluid pressure required to maintain the poppet assembly in the open position is less than the cracking pressure. The angle may be such that the fluid pressure required to advance the poppet assembly in the downstream direction is greater than the cracking pressure.

The check valve may further include at least one shaft; and at least one torsion spring extending about the at least one shaft. The at least one cam may be rotatably supported by the at least one shaft proximate the first end. The at least one torsion spring may be configured to bias the at least one cam arm in a rotational direction against the roller, so that the at least one cam arm and the at least one roller are configured to urge the poppet assembly in the upstream direction. The check valve may further include at least one second extension extending from the upstream side, the at least one second extension configured to receive the at least one shaft therein. The at least one shaft may include a first end and a second end, and the at least one cam arm may be rotatably supported by the at least one shaft at the first end of the at least one cam arm, and the at least one second extension may receive the second end of the at least one shaft.

The poppet body may define a receiving space configured to receive at least a portion of the at least one cam arm therein when the poppet is in the closed position. The at least one roller may include two rollers, and the at least one cam arm may include two cam arms. The at least one roller may include two rollers, and the at least one cam arm may include two cam arms. A first roller and a first cam arm may define a first pair, and a second roller and a second cam arm may define a second pair. The first pair and the second pair may be displaced symmetrically about the connecting rod.

According to another aspect or embodiment of the present disclosure, a check valve may include: a valve body defining a flow path and extending about a longitudinal axis; a check seat extending from the valve body, the check seat including: a downstream side; an upstream side; an interior space defined between the downstream side and the upstream side, interior space defining a fluid flow path; a first extension extending from the upstream side in an upstream direction; and a second extension extending from the upstream side in the upstream direction; a poppet assembly including: a poppet body and a poppet seat, the poppet seat configured to form a fluid-tight seal with the downstream side in a closed position, the poppet body being configured to obstruct the fluid flow path; a third extension extending from the poppet body in the upstream direction, the third extension comprising a first roller; a fourth extension extending from the poppet body in the upstream direction, the fourth extension comprising a second roller; a first cam arm extending from the first extension in a downstream direction, the first cam arm being configured to engage with the first roller; a second cam arm extending from the second extension in a downstream direction, the second cam arm being configured to engage with the second roller. The poppet assembly may be configured to move in a downstream direction into an open position, thereby moving the first roller along the first cam arm and the second roller along the second cam arm.

The check valve may further include: a first torsion spring acting on the first cam arm; and a second torsion spring acting on the second cam arm. The first torsion spring may be configured to bias the first cam arm in a first rotational direction, and the second torsion spring may be configured to bias the second cam arm in a second rotational direction. The biases created by the first torsion spring and the second torsion spring may be such that the engagement of the first cam arm with the first roller and the engagement between the second cam arm with the second roller are configured to urge the poppet assembly in the upstream direction. The first rotational direction may be the opposite of the second rotational direction. The first cam arm and the second cam arm may both include a body having a first end and a second end, the bodies both defining elbows between the first ends and the second ends. The first roller may be configured to be received within the elbow of the first cam arm, and the second roller may be configured to be received within the elbow of the second cam arm. The first cam arm and the second cam arm may both include a sloped surface extending from their respective elbows in a downstream direction, and the sloped surfaces may be angled relative to the longitudinal axis. The check valve may further include: a first shaft; and a second shaft. The first shaft may extend from the first extension, and the first cam arm is configured to rotate about the first shaft. The second shaft may extend from the second extension, and the second cam arm may be configured to rotate about the second shaft. The first torsion spring may be disposed at least partially around the first shaft, and the second torsion spring may be disposed at least partially around the second shaft.

In some aspects or embodiments, the present disclosure may be represented by the following clauses.

Clause 1. A check seat defining a flow path and extending about a longitudinal axis, the check seat comprising a downstream side and an upstream side; a poppet assembly comprising a poppet body and a poppet seat, the poppet seat configured to form a fluid-tight seal with the downstream side, the poppet body being configured to obstruct the flow path; at least one first extension extending from the poppet body in an upstream direction, the at least one first extension comprising a roller; and at least one cam arm disposed at least partially upstream of the poppet body and the check seat, the at least one cam arm configured to engage with the at least one roller, wherein, when a fluid pressure created by a fluid in the flow path reaches a cracking pressure, the poppet assembly is configured to move in a downstream direction, thereby breaking the fluid-tight seal, wherein engagement between the at least one cam arm and the at least one roller is configured to urge the poppet in the upstream direction, wherein, when the fluid-tight seal is formed between the poppet seat and the valve seat, the poppet is in the closed position, and wherein, when the fluid-tight seal is broken and the poppet is moved downstream, the poppet is in the open position.

Clause 2. The check valve of clause 1, further comprising: a connecting rod connecting the poppet to the check body, the connecting rod extending through the check body; and a compression spring disposed between the connecting rod and the check seat, wherein the connecting rod is configured to slide within the check body as the poppet moves in the downstream and upstream directions, and wherein the spring is configured to urge the poppet assembly in the upstream direction.

Clause 3. The check valve of clause 1 or 2, wherein the at least one cam arm comprises a body, the body defining an elbow configured to receive the at least one roller therein when the poppet assembly is in the closed position.

Clause 4. The check valve of clause 3, wherein the body of the at least one cam arm comprises a first end and a second end, and wherein the elbow is located between the first end and the second end.

Clause 5. The check valve of clause 4, wherein the at least one cam arm comprises a sloped surface extending from the elbow in a downstream direction, and wherein the sloped surface is sloped relative to the longitudinal axis.

Clause 6. The check valve of clause 5, wherein the angle formed between the sloped surface and the longitudinal axis is such that the fluid pressure required to maintain the poppet assembly in the open position is less than the cracking pressure.

Clause 7. The check valve of clause 5, wherein the angle formed between the sloped surface and the longitudinal axis is such that the fluid pressure required to advance the poppet assembly in the downstream direction is greater than the cracking pressure.

Clause 8. The check valve of any of clause 3-7, further comprising: at least one shaft; and at least one torsion spring extending about the at least one shaft, wherein the at least one cam arm is rotatably supported by the at least one shaft proximate the first end, and wherein the at least one torsion spring is configured to bias the at least one cam arm in a rotational direction against the roller, so that the at least one cam arm and the at least one roller are configured to urge the poppet assembly in the upstream direction.

Clause 9. The check valve of clause 8, further comprising at least one second extension extending from the upstream side, the at least one second extension configured to receive the at least one shaft therein.

Clause 10. The check valve of clause 9, wherein the at least one shaft comprises a first end and a second end, and wherein the at least one cam arm is rotatably supported by the at least one shaft at the first end of the at least one cam arm, and the at least one second extension receives the second end of the at least one shaft.

Clause 11. The check valve of any of clauses 1-10, wherein the poppet body defines a receiving space configured to receive at least a portion of the at least one cam arm therein when the poppet assembly is in the closed position.

Clause 12. The check valve of any of clauses 1-11, wherein the at least one roller comprises two rollers, and the at least one cam arm comprises two cam arms.

Clause 13. The check valve of any of clauses 2-12, wherein the at least one roller comprises two rollers, and the at least one cam arm comprises two cam arms, wherein a first roller and a first cam arm define a first pair, and a second roller and a second cam arm define a second pair, and wherein the first pair and the second pair are displaced symmetrically about the connecting rod.

Clause 14. A check valve comprising: a valve body defining a flow path and extending about a longitudinal axis; a check seat extending from the valve body, the check seat comprising: a downstream side; an upstream side; an interior space defined between the downstream side and the upstream side, interior space defining a fluid flow path; a first extension extending from the upstream side in an upstream direction; and a second extension extending from the upstream side in the upstream direction; a poppet assembly comprising a poppet body and a poppet seat, the poppet seat configured to form a fluid-tight seal with the downstream side in a closed position, the poppet body being configured to obstruct the fluid flow path; a third extension extending from the poppet body in the upstream direction, the third extension comprising a first roller; a fourth extension extending from the poppet body in the upstream direction, the fourth extension comprising a second roller; a first cam arm extending from the first extension in a downstream direction, the first cam arm being configured to engage with the first roller; a second cam arm extending from the second extension in a downstream direction, the second cam arm being configured to engage with the second roller, wherein the poppet assembly is configured to move in a downstream direction into an open position, thereby moving the first roller along the first cam arm and the second roller along the second cam arm.

Clause 15. The check valve of clause 14, further comprising: a first torsion spring acting on the first cam arm; and a second torsion spring acting on the second cam arm, wherein the first torsion spring is configured to bias the first cam arm in a first rotational direction, wherein the second torsion spring is configured to bias the second cam arm in a second rotational direction, and wherein the biases created by the first torsion spring and the second torsion spring are such that the engagement of the first cam arm with the first roller and the engagement between the second cam arm with the second roller are configured to urge the poppet assembly in the upstream direction.

Clause 16. The check valve of clause 15, wherein the first rotational direction is the opposite of the second rotational direction.

Clause 17. The check valve of any of clauses 14-16, wherein the first cam arm and the second cam arm both comprise a body having a first end and a second end, the bodies both defining elbows between the first ends and the second ends.

Clause 18. The check valve of clause 17, wherein the first roller is configured to be received within the elbow of the first cam arm, and the second roller is configured to be received within the elbow of the second cam arm Clause 19. The check valve of clause 17, wherein the first cam arm and the second cam arm both comprise a sloped surface extending from their respective elbows in a downstream direction, and wherein the sloped surfaces are sloped relative to the longitudinal axis.

Clause 20. The check valve of any of clauses 15-19, further comprising: a first shaft; and a second shaft, wherein the first shaft extends from the first extension, and the first cam arm is configured to rotate about the first shaft, wherein the second shaft extends from the second extension, and the second cam arm is configured to rotate about the second shaft, wherein the first torsion spring is disposed at least partially around the first shaft, and wherein the second torsion spring is disposed at least partially around the second shaft.

BRIEF DESCRIPTION OF THE DRAWING(S)

DESCRIPTION OF THE INVENTION

Figure 1:
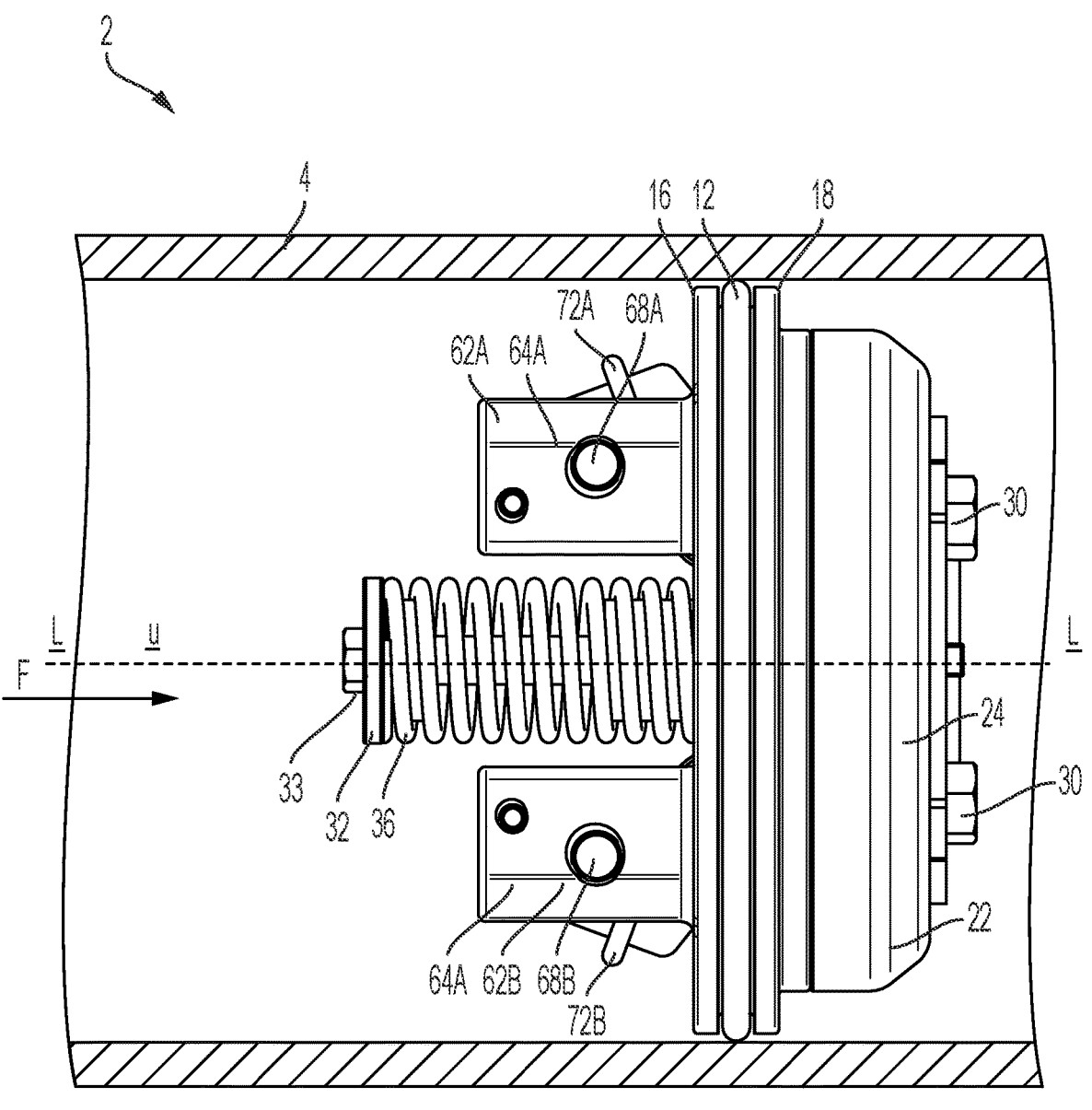
FIG. 1 shows a partially cross-sectional side view of a check valve disposed in a pipe or valve body according to one aspect or embodiment of the present disclosure.
Figure 2:
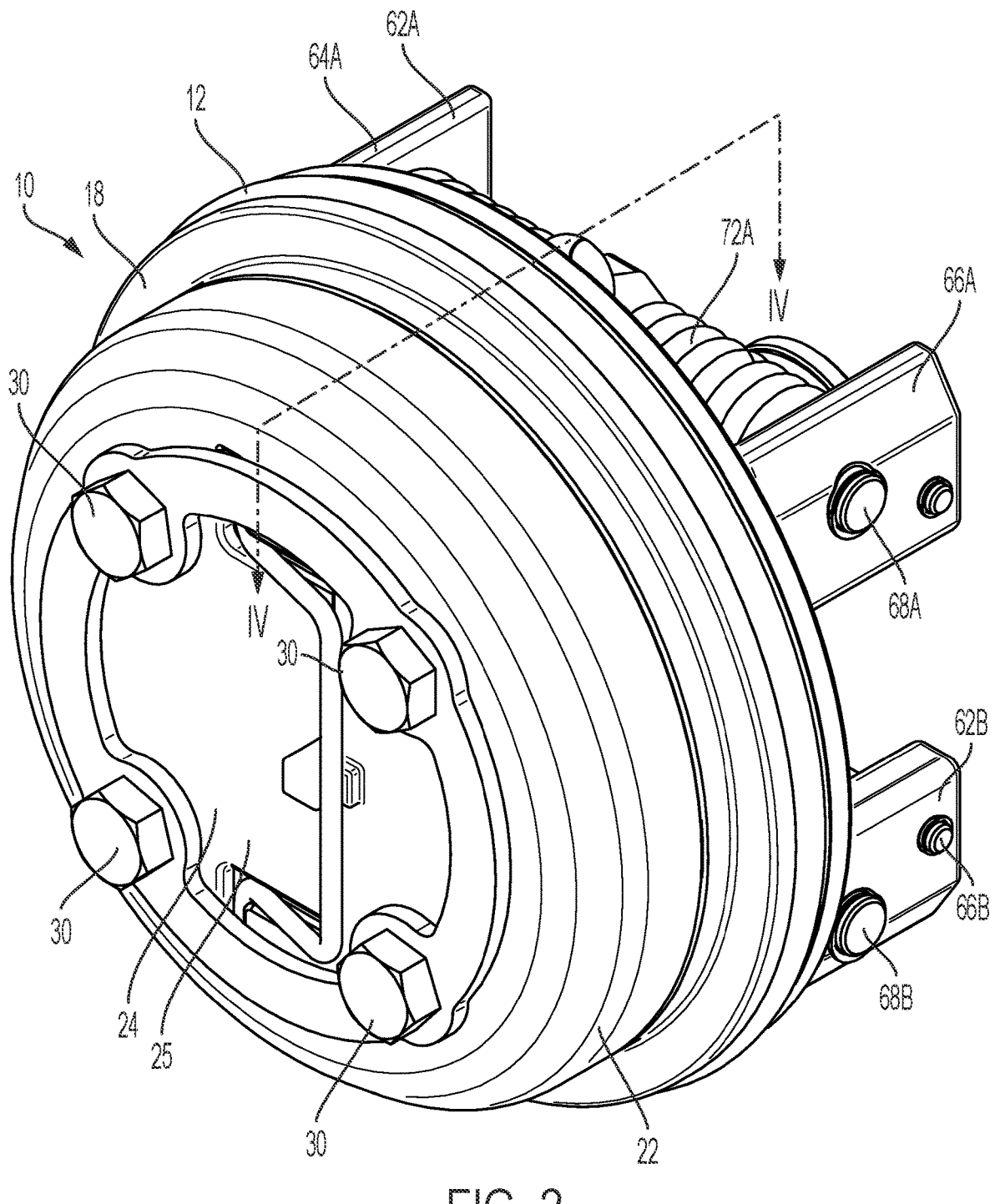
FIG. 2 shows a perspective view of the check valve of FIG. 1 looking in an upstream direction.

As used herein, the singular form of "a", "an", and "the" include plural referents unless the context clearly dictates otherwise.

Spatial or directional terms, such as "left", "right", "inner", "outer", "above", "below", and the like, relate to the disclosure as shown in the drawing figures and are not to be considered as limiting as the disclosure can assume various alternative orientations.

All numbers and ranges used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

The terms "first", "second", and the like are not intended to refer to any particular order or chronology, but refer to different conditions, properties, or elements.

The term "includes" is synonymous with "comprises".

As used herein, the terms "perpendicular" or "substantially perpendicular" mean a relative angle as between two objects at their real or theoretical intersection is from 85° to 90°, or from 87° to 90°, or from 88° to 90°, or from 89° to 90°, or from 89.5° to 90°, or from 89.75° to 90°, or from 89.9° to 90°, inclusive of the recited values.

The present disclosure is directed to a check valve assembly 10 for use in a piping system 2. With reference to FIG. 1, the check valve assembly 10 is disposed within a valve body 4 that surrounds the check valve assembly 10 and extends about a longitudinal axis L. Fluid flows in the directions shown with the arrow F. The check valve assembly 10 defines an upstream area U and a downstream area D within the piping system 2. The upstream area U is located upstream of the check valve assembly 10, and the downstream area D is located downstream of the check valve assembly 10. When viewing FIGS. 1-7, the upstream area U is generally to the left of the page, and the downstream area D is generally to the right. Upstream and downstream also define directions, meaning that if some element extends or moves in the upstream direction, that element is extending or moving in the direction of the upstream area U. If some element extends or moves in the downstream direction, then that element extends or moves in the direction of the downstream area D. Fluid flows in the downstream direction from the upstream area U to the downstream area D.

With reference to FIGS. 1-7, the check valve assembly 10 is shown as a poppet valve. While being shown within a simple valve body 4, one having ordinary skill in the art will understand how the check valve assembly 10 can be displaced in more complex valve bodies 4 and piping systems 2. The check valve assembly 10 includes a check seat 12 and a poppet assembly 22. The check seat 12 is rounded, and in some embodiments, substantially circular. The check seat 12 also extends about the longitudinal axis L. The check seat 12 extends from the valve body 4 and further defines the fluid flow path F within the valve body 4. The check seat 12 defines an interior space 14 and includes an upstream side 16 and a downstream side 18, with the interior space 14 extending between those sides 16, 18. The interior space 14 is partially open, defining spaces 20, so that fluid may flow through the interior space 14 and against the poppet assembly 22, in a manner which will be described below. Therefore, the interior space 14 further defines the fluid flow path F within the check seat 12.

Figure 5:
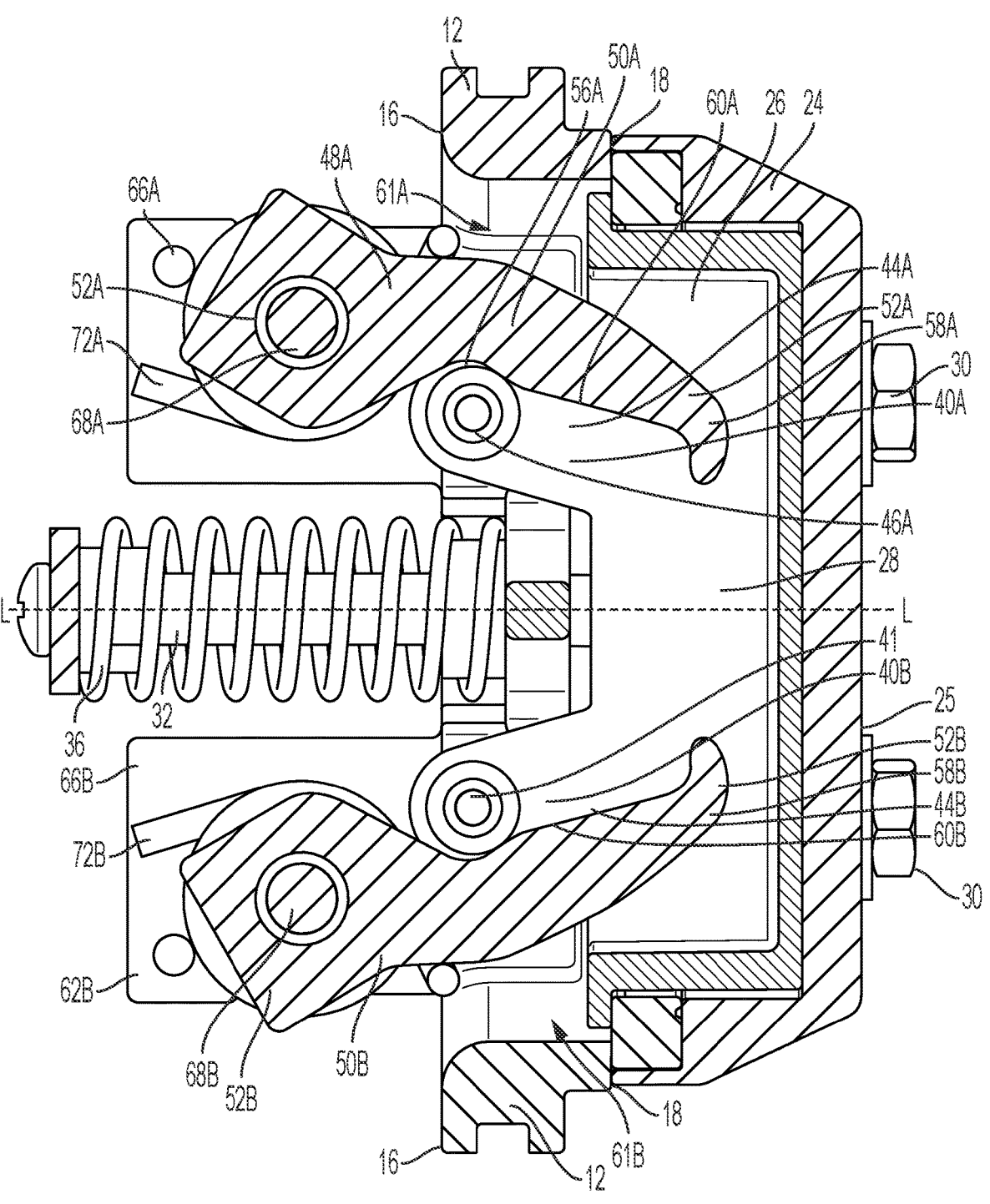
FIG. 5 shows a cross-sectional side view of the check valve of FIG. 1 in a closed position taken along line V-V in FIG. 4.

Connected to the check seat 12 is the poppet assembly 22. The poppet assembly 22 is arranged to obstruct the interior space 14 in such a way that blocks fluid from flowing through the check seat 12. The poppet assembly 22 forms a fluid tight seal with the downstream side 18 of the check seat 12 to prevent fluid from flowing through the check seat 12. When the seal is formed between the poppet assembly 22 and the check seat 12, the poppet assembly 22 is in a closed position, as shown in FIG. 5. When the seal is broken and the poppet assembly 12 moves down stream so that there is some space between the poppet assembly 22 and check seat 12, the poppet assembly 22 is in an open position. This is exemplified in FIG. 6. As will be understood from this disclosure, the poppet assembly 22 may be in many different downstream locations relative to the check seat 12 and still be considered to be in the open position.

The poppet assembly 22 includes a poppet shell 24 that includes an outer surface 25. The shell 24 defines a receiving space 26 that receives an insert 28. The shell 24 also defines a poppet seat 29 extending around its perimeter and around the insert 28 when the insert 28 is in the receiving space 26. The poppet 29 is arranged to contact the downstream side 18 to form the fluid tight seal between the check seat 12 and the poppet assembly 22. The shell 24 and insert 28 are connected via fasteners 30 that are inserted into corresponding apertures (not numbered) in both the shell 24 and insert 28. As shown, the fasteners 30 are screws, but other fasteners known to those having skill in the art may be used. Together, the shell 24 and insert 28 can be considered a poppet body. The shell 24 and insert 28 individually may also be considered the poppet body.

Extending from the insert 28 in the upstream direction is a connecting bar 32. The connecting bar 32 is received by and passes through an aperture 34 in the check seat 12. The connecting bar 32 continues to extend beyond the aperture 34 in the upstream direction, so that the connecting bar 32 extends farther upstream than the upstream side 16 of the check seat 12. An aperture extension 38 extends from the upstream side 16 in the upstream direction, surrounding at least a portion of the connecting bar 32 as it extends beyond the upstream side 16. The connecting bar 32 terminates with a head 33 that is adjacent to a terminal surface of the aperture extension 38. In some embodiments, the head 33 may rest on the terminal surface of the aperture extension 38. This arrangement connects the poppet assembly 22 to the check seat 12.

A compression spring 36 extends around the aperture extension 38 and rests against the upstream side 16 of the check seat 12. The compression spring 36 extends around a side of the aperture extension 38 opposite the connecting bar 32. If the connecting bar 32 extends upstream beyond the aperture extension 38, then the compression spring 36 may extend directly about the connecting bar 32. The compression spring 36 has a diameter that is smaller than the diameter or width of the head 33, so that the compression spring 36 is contained between the head 33 and the upstream side 16. When in the closed position, the spring 36 may already be compressed to some degree. This generates a force on the head 33 that urges the poppet assembly 22 in the upstream direction via the connecting bar 32. This keeps the poppet assembly 22 in the closed position, as the poppet assembly 22 is restricted from moving farther in the upstream direction by the downstream side 18 of the check seat 12. The cracking pressure may be equal to or be a function of the initial force created by the compression spring 36. Whenever the poppet assembly 22 moves into the open position some distance in the downstream direction, the connecting bar 32 and head 33 also move in the downstream direction. This movement compresses the spring 36 even more, increasing the force acting on the head 33. This means that, as fluid flow continues to act on the poppet assembly 22 and moves the poppet assembly 22 farther in the downstream direction, the spring 36 will generate a larger force, continuing to urge the poppet assembly 22 to move back in the upstream direction, toward the closed position. Eventually, the force generated by the compression of the spring 36 may overcome the force of fluid flow acting on the poppet assembly 22, and the poppet assembly 22 will stop its downstream movement and/or begin to move back upstream.

Figure 6:
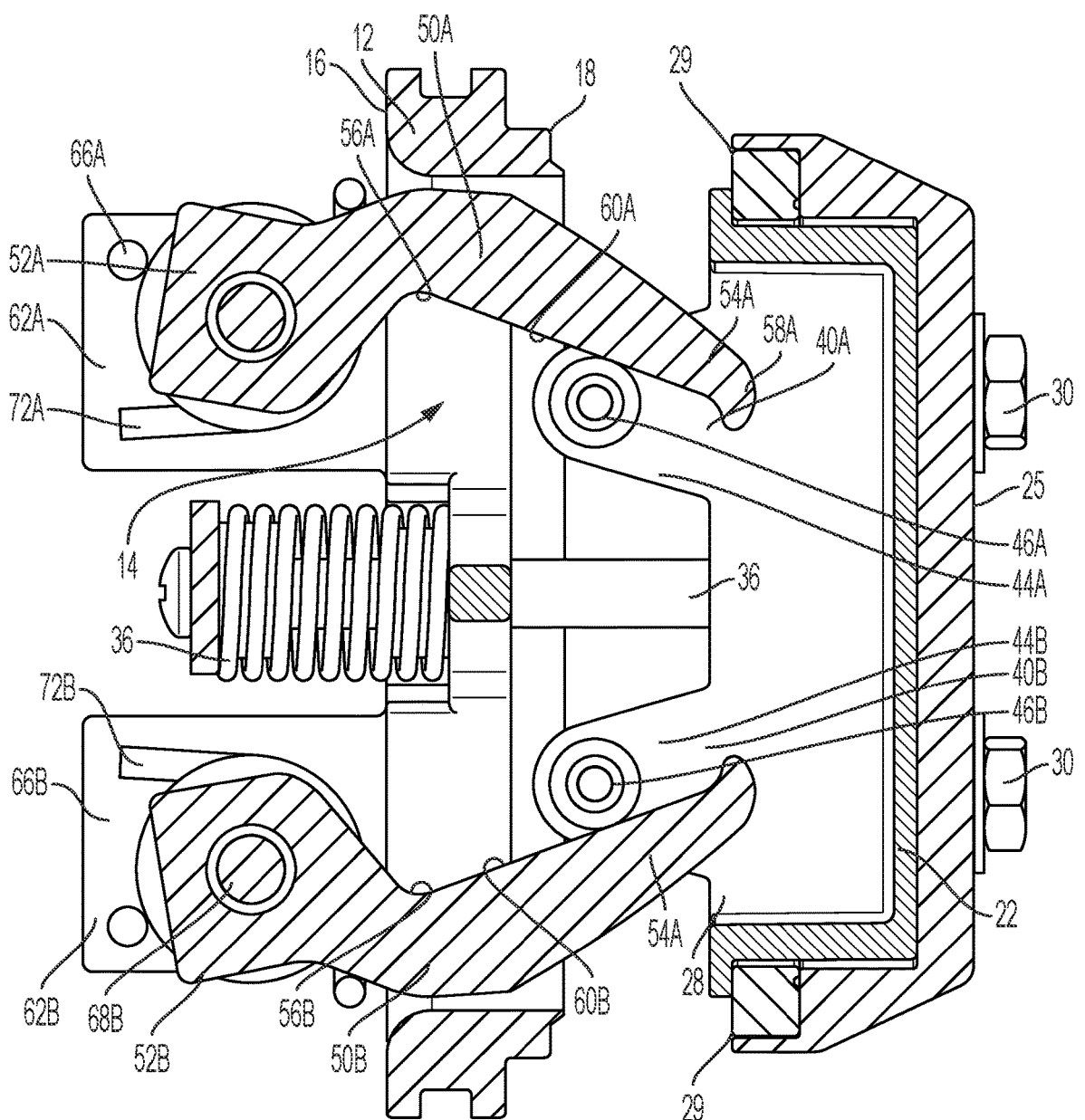
FIG. 6 shows a cross-sectional side view of the check valve of FIG. 1 in an open position taken along line V-V in FIG. 4.
Figure 7:
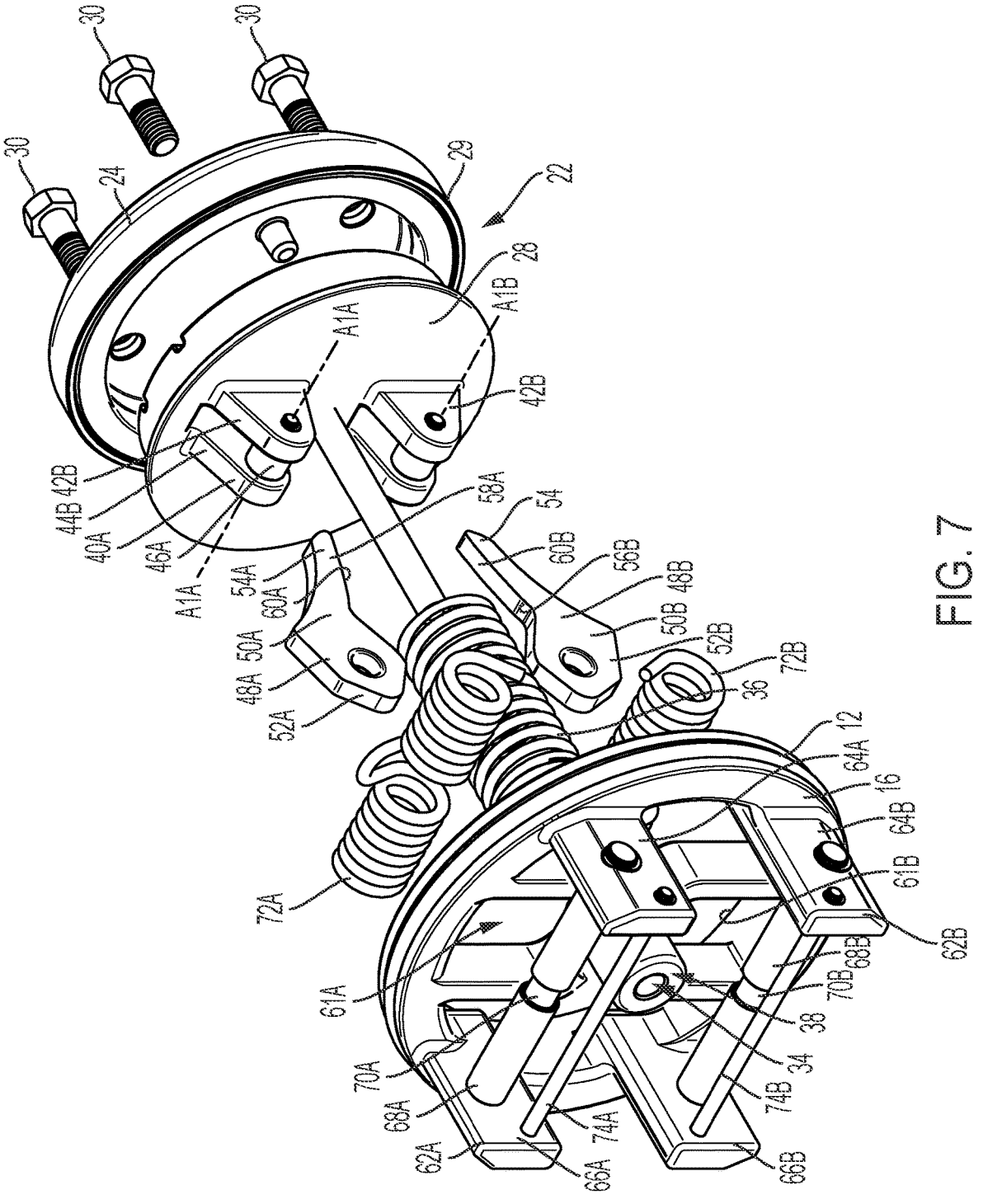
FIG. 7 shows an exploded view of the check valve of FIG. 1.

As shown in FIGS. 5-7, additional features acting on the poppet assembly 22 will now be described. Extending in an upstream direction from the insert 28 are extensions 40A, 40B. The extensions 40A, 40B include first legs 42A, 42B and second legs 44A, 44B, with a roller 46A, 46B supported between a respective pair of legs 42A, 44A, 42B, 44B. Roller 46A extends between legs 42A, 44A, and roller 46B extends between legs 42B, 44B. The legs 42A, 42B, 44A, 44B extend upstream to define a substantially perpendicular angle relative to the upstream face of the insert 28. The rollers 46A, 46B extend substantially parallel to the upstream face of the insert 28. As shown, the extensions 40A, 40B are arranged on the insert 28 symmetrically about the connecting bar 32, with extension 40A disposed above the connecting bar 32 and extension 40B disposed below the connecting bar 32. It will be appreciated that the extensions 40A, 40B may be arranged differently about the insert 28 and still maintain the same functionality with the other features described below. The legs 42A, 42B, 44A, 44B extend in an upstream direction so that the rollers 46A, 46B are located within the internal space 14 or upstream thereof in the closed position. Additional arrangements may also be considered. For example, the rollers 46A, 46B may be retained entirely downstream of the poppet seat 29.

Engaged with the extensions 40A, 40B are cam arms 48A, 48B. In particular, the cam arms 48A, 48B engage with the rollers 46A, 46B. Cam arm 48A engages with roller 46A, and cam arm 48B engages with roller 46B. The cam arms 48A, 48B, respectively, include bodies 50A, 50B, both having a first end 52A, 52B and a second end 54A, 54B. Between the ends 52A, 54B, 52B, 54B are elbows 56A, 56B. The elbows 56A, 56B define angles, such that the rollers 46A, 46B are received within the elbows 56A, 56B when the poppet assembly 22 is in the closed position. The angles of the elbows 56A, 56B impact the opening characteristics of the poppet assembly 22, which will be discussed below. Extending from the elbows 56A, 56B in the direction of the second ends 54A, 54B are sloped surfaces 60A, 60B. The sloped surfaces 60A, 60B are arranged to contact and engage with the rollers 46A, 46B when the poppet assembly 22 moves downstream in the open position. The sloped surfaces 60A, 60B define a slope relative to the longitudinal axis L and/or the direction of fluid flow F. Like the angle of the elbows 56A, 56B, the angle of the sloped surfaces 60A, 60B can be chosen for desired opening characteristics of the poppet assembly 22. These features will be discussed below. Hooks 58A, 58B are located at and extend from the second ends 54A, 54B. The hooks 58A, 58B are arranged to "catch" the rollers 46A, 46B when they have moved along the entire length of their respective cam arm 48A, 48B. When the rollers 46A, 46B are in this position, the poppet assembly 22 may be located as far downstream as possible, as compression of the spring 36 is likely at or near its maximum amount. The spring 36 may be chosen so that its maximum compression force maintains the poppet assembly 22 in an open position that does not allow for the rollers 46A, 46B to move downstream of the second ends 54A, 54B and hooks 58A, 58B. The hooks 58A, 58B may also be shaped to ensure that the rollers 46A, 46B are retained against the cam arms 48A, 48B, regardless of the state of the spring 36.

Referring again to FIGS. 1-7, the upstream features that act on the cam arms 48A, 48B will now be described. The first ends 52A, 52B of the cam arms 48A, 48B are mounted to extensions 62A, 62B that extend from the upstream side 16 in the upstream direction. To accommodate the cam arms 48A, 48B, the check seat 12 defines slots 61A, 61B, so that the cam arms 48A, 48B can extend upstream to be mounted or otherwise connected to the extensions 62A, 62B. The extensions 62A, 62B include, respectively, first posts 64A, 64B and second posts 66A, 66B, with shafts 68A, 68B extending between the pairs of posts 64A, 66A, 64B, 66B. Shaft 68A extends between first post 64A and second post 66A, and shaft 68B extends between first post 64B and second post 66B. As shown, the posts 64A, 64B, 66A, 66B extend substantially perpendicular to the upstream side 16 of the check seat 12, with the shafts 68A, 68B extending substantially parallel to the upstream side 16. Other arrangements may be made and still retain the functionality that will be described. The shafts 68A, 68B define notches 70A, 70B that are arranged for the first ends 52A, 52B of the cam arms 48A, 48B to mounted thereto. Support beams 74A, 74B extend between the pairs of posts 64A, 66A, 64B, 66B to provide additional support or mountability for the assembly 10.

Figure 3:
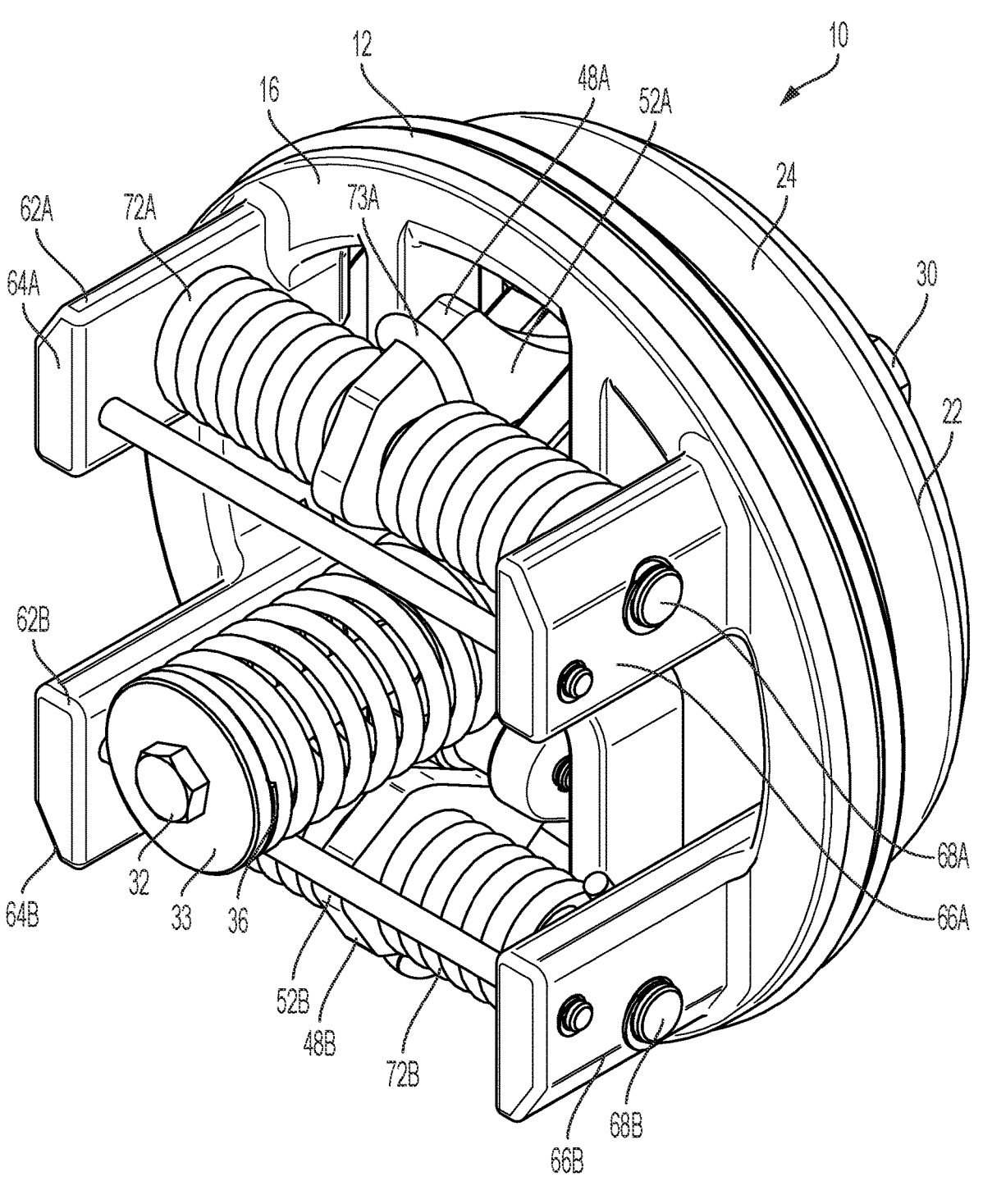
FIG. 3 shows an perspective view of the check valve of FIG. 1 looking in a downstream direction.
Figure 4:
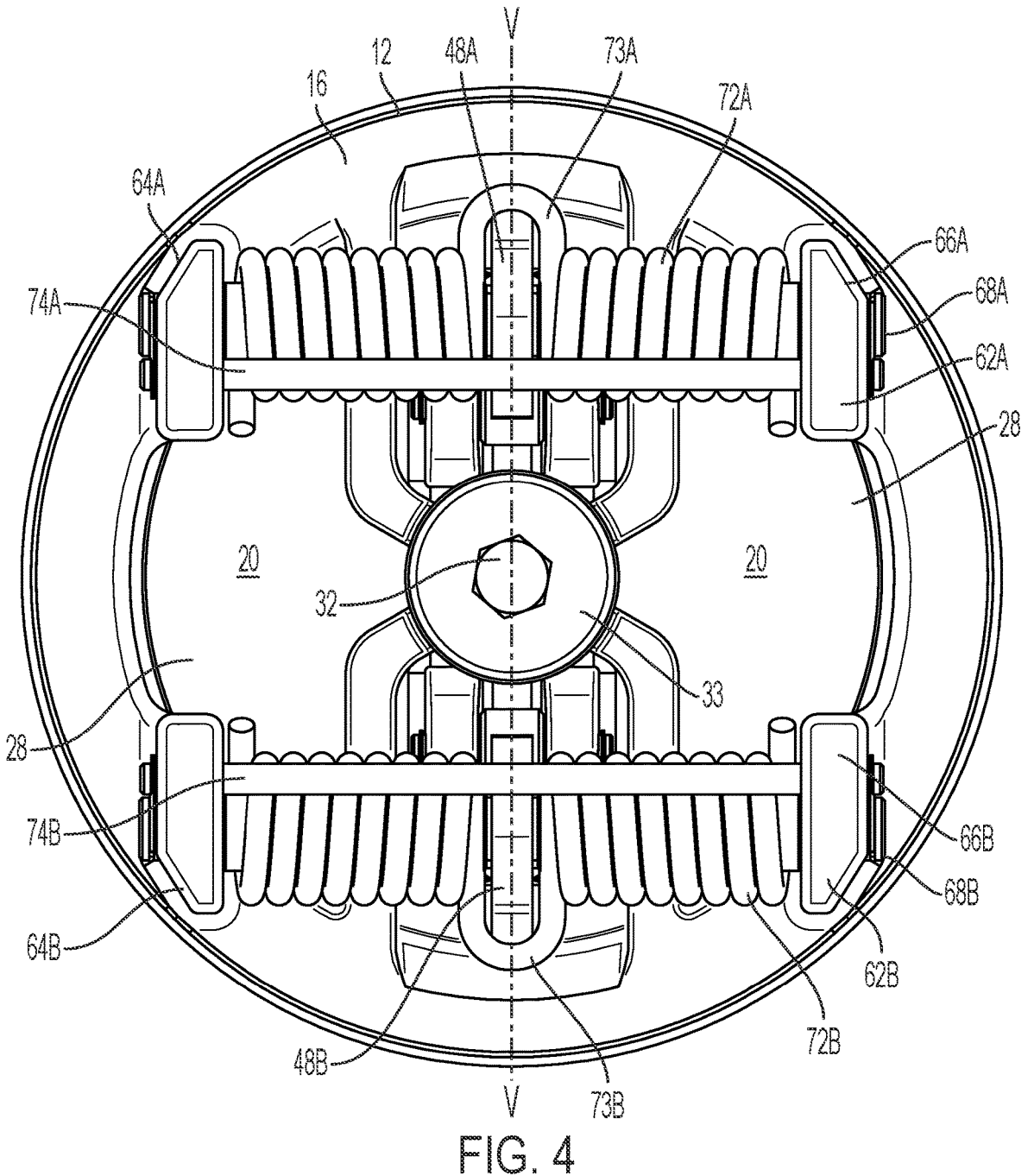
FIG. 4 shows a side view of the check valve of FIG. 1 looking in the downstream direction.

Referring again to FIGS. 1-7, the first ends 52A, 52B of the cam arms 48A, 48B are mounted about the shafts 68A, 68B at the location of the notches 74A, 74B. Like extensions 40A, 40B, the cam arms 48A, 48B are arranged symmetrically about the connecting bar 32, with cam arm 48A disposed above the connecting bar 32 and cam arm 48B disposed below the connecting bar 32. Other arrangements of the cam arms 48A, 48B about the connecting bar 32 or about the check seat 12 may be utilized, so long as the cam arms 48A, 48B maintain their engagement with the rollers 46A, 46B. Torsion springs 72A, 72B are also respectively mounted about the shafts 68A, 68B. As shown in FIGS. 3 and 4, portions 73A, 73B of the torsion springs 72A, 72B extend across the cam arms 48A, 48B. This arrangement allows the torsion springs 72A, 72B to bias the cam arms 48A, 48B in a rotational direction about their respective shafts 68A, 68B. For example, torsion spring 72A biases cam arm 48A so that the cam arm 48A is urged to rotate in a clockwise direction, and torsion spring 72B biases cam arm 48B so that the cam arm 48B is urged to rotate in a counter clockwise direction. The actual rotation of the cam arms 48A, 48B are limited by their engagement with their respective rollers 46A, 46B. However, as the poppet assembly 22 moves downstream and the rollers 46A, 46B move along the cam arms 48A, 48B, the rollers 46A, 46B will experience the biasing force created by the relevant torsion spring 72A, 72B. Thus, the biasing force can be imparted on the rollers 46A, 46B such that they are urged in either the upstream or downstream direction. This means the poppet assembly 22 is urged in either the upstream or downstream direction via the connection between the extensions 40A, 40B and the insert 28. In the example provided above, with cam arm 48A being urged to rotate clockwise and cam arm 48B being urged to rotate counter clockwise, the cam arms 48A, 48B are essentially pushing their respective rollers 46A, 46B in the upstream direction, which in turn pulls the poppet assembly 22 in the upstream direction. This means that the force created by the fluid flow must now overcome the force created by the compression spring 36 and those created by the torsion springs 72A, 72B.

In an opposite example, with cam arm 48A being urged to rotate counter clockwise and cam arm 48B being urged to rotate clockwise, an upstream force is not provided against the rollers 46A, 46B, meaning the fluid flow must only overcome the force of the compression spring 36 to open the poppet assembly 22. Taking this a step further, the cam arm bodies 50A, 50B may be shaped to provide a surface, so that the rotational forces of the torsion springs 72A, 72B are imparted onto the rollers 46A, 46B in such a manner that the rollers 46A, 46B are pushed in the downstream direction. Therefore, the force needed from the fluid flow to open the poppet assembly 22 may be less than that of the force created by the compression spring 36.

The angles defined by the elbows 56A, 56B and the slope of the sloped surfaces 60A, 60B may also impact the amount of force needed to: (a) open the poppet assembly 22; (b) keep the poppet assembly 22 open; and/or (c) advance the poppet assembly 22 in the downstream direction. For example, the angle of the elbows 56A, 56B may be acute angles, meaning that the rollers 46A, 46B are "trapped" within the elbows 56A, 56B, which strongly urges the poppet assembly in the upstream direction. This increases the cracking pressure required to open the poppet assembly 22 relative to the cracking pressure when only the compression spring 36 is used. However, once this cracking pressure is reached and the rollers 46A, 46B are freed from their elbow 56A, 56B, the pressure required to maintain the poppet assembly 22 in the open position may be less than the cracking pressure. This means that it is easier to maintain the poppet assembly 22 in the open position and to advance the poppet assembly 22 in the downstream direction after the cracking pressure has been reached. Similar to this example, if the elbows 56A, 56B define an obtuse angle, the cracking pressure may still be increased due to the placement of the rollers 46A, 46B in the elbows 56A, 56B, but that cracking pressure will be less than that of the previous example, and the fluid force required to keep the poppet assembly 22 in the open position or to advance the poppet assembly in the downstream direction may be greater than the previous example.

Changing the slopes of the sloped surfaces 60A, 60B also influences the characteristics of the poppet assembly 22 with respect to its opening characteristics. For example, the slopes may be gentle, meaning the urging of the cam arms 48A, 48B in either rotational direction by the torsion springs 72A, 72B only imparts a small force on the rollers 46A, 46B. This may increase or decrease the cracking pressure by a small amount. This may also increase or decrease the amount of force required to keep the poppet assembly 22 in the open position or to advance the poppet assembly 22 downstream. In other examples, the slopes may be more steep, which act on the rollers 46A, 46B in such a way that increases the fluid force necessary to keep the poppet assembly 22 open or to advance the poppet assembly 22 downstream. Based on this disclosure, one having skill in the art will appreciate that the direction of the forces created by the torsion springs 72A, 72B as well as the shapes and angles of the elbows 56A, 56B and sloped surfaces 60A, 60B can have a range of impacts on the opening of the poppet assembly 22. In one example, the elbows 56A, 56B may define a 25-50 degree angle, and the sloped surfaces 60A, 60B may define a 15-30 degree angle with the longitudinal axis L. In some embodiments, the cam arm body 48A, 48B may even be rounded (i.e., convex or concave), not defining a consistent slope, to impact the opening characteristics of the poppet assembly 22. In some other embodiments, the engagement between the cam arms 48A, 48B and the rollers 46A, 46B may be sufficient to define the cracking pressure and the opening characteristics of the poppet assembly 22, without the need for a compression spring 36. In other embodiments, the cam arms 48A, 48B may include different bumps and/or imperfections that impact the movement of the rollers 46A, 46B to achieve desired opening characteristics of the poppet assembly 22.

While specific embodiments of the devices of the present disclosure have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the device of the present disclosure which is to be given the full breadth of the claims appended and any and all equivalents thereof.

The invention claimed is:

1. A check valve comprising:
a check seat defining a flow path and extending about a longitudinal axis, the check seat comprising a downstream side and an upstream side;
a poppet assembly comprising a poppet body and a poppet seat, the poppet seat configured to form a fluid-tight seal with the downstream side, the poppet body being configured to obstruct the flow path;
at least one first extension extending from the poppet body in an upstream direction, the at least one first extension comprising a roller; and
at least one cam arm disposed at least partially upstream of the poppet body and the check seat, the at least one cam arm configured to engage with the at least one roller,
wherein, when a fluid pressure created by a fluid in the flow path reaches a cracking pressure, the poppet assembly is configured to move in a downstream direction, thereby breaking the fluid-tight seal,
wherein engagement between the at least one cam arm and the at least one roller is configured to urge the poppet in the upstream direction,
wherein, when the fluid-tight seal is formed between the poppet seat and the valve check seat, the poppet is in the closed position, and
wherein, when the fluid-tight seal is broken and the poppet is moved downstream, the poppet is in the open position.

2. The check valve of claim 1, further comprising:
a connecting bar connecting the poppet assembly to the check seat, the connecting bar extending through the check seat; and
a compression spring disposed between the connecting bar and the check seat,
wherein the connecting bar is configured to slide within the check seat as the poppet assembly moves in the downstream and upstream directions, and wherein the spring is configured to urge the poppet assembly in the upstream direction.

3. The check valve of claim 2, wherein the at least one roller comprises two rollers, and the at least one cam arm comprises two cam arms,
wherein a first roller and a first cam arm define a first pair, and a second roller and a second cam arm define a second pair, and
wherein the first pair and the second pair are displaced symmetrically about the connecting rod.

4. The check valve of claim 1, wherein the at least one cam arm comprises a body, the body defining an elbow configured to receive the at least one roller therein when the poppet assembly is in the closed position.

5. The check valve of claim 4, wherein the body of the at least one cam arm comprises a first end and a second end, and
wherein the elbow is located between the first end and the second end.

6. The check valve of claim 5, wherein the at least one cam arm comprises a sloped surface extending from the elbow in a downstream direction, and
wherein the sloped surface is angled relative to the longitudinal axis.

7. The check valve of claim 6, wherein the angle formed between the sloped surface and the longitudinal axis is such that the fluid pressure required to maintain the poppet assembly in the open position is less than the cracking pressure.

8. The check valve of claim 6, wherein the angle formed between the sloped surface and the longitudinal axis is such that the fluid pressure required to advance the poppet assembly in the downstream direction is greater than the cracking pressure.

9. The check valve of claim 5, further comprising:
at least one shaft; and
at least one torsion spring extending about the at least one shaft,
wherein the at least one cam arm is rotatably supported by the at least one shaft proximate the first end, and
wherein the at least one torsion spring is configured to bias the at least one cam arm in a rotational direction against the roller, so that the at least one cam arm and the at least one roller are configured to urge the poppet assembly in the upstream direction.

10. The check valve of claim 9, further comprising at least one second extension extending from the upstream side, the at least one second extension configured to receive the at least one shaft therein.

11. The check valve of claim 10, wherein the at least one shaft comprises a first end and a second end, and
wherein the at least one cam arm is rotatably supported by the at least one shaft at the first end of the at least one cam arm, and the at least one second extension receives the second end of the at least one shaft.

12. The check valve of claim 1, wherein the poppet body defines a receiving space configured to receive at least a portion of the at least one cam arm therein when the poppet assembly is in the closed position.

13. The check valve of claim 1, wherein the at least one roller comprises two rollers, and the at least one cam arm comprises two cam arms.

14. A check valve comprising:
a valve body defining a flow path and extending about a longitudinal axis;
a check seat extending from the valve body, the check seat comprising:

a downstream side;

an upstream side;

an interior space defined between the downstream side and the upstream side, the interior space defining a fluid flow path;

a first extension extending from the upstream side in an upstream direction; and a second extension extending from the upstream side in the upstream direction;

a poppet assembly comprising a poppet body and a poppet seat, the poppet seat configured to form a fluid-tight seal with the downstream side in a closed position, the poppet body being configured to obstruct the fluid flow path;

a third extension extending from the poppet body in the upstream direction, the third extension comprising a first roller;

a fourth extension extending from the poppet body in the upstream direction, the fourth extension comprising a second roller;

a first cam arm extending from the first extension in a downstream direction, the first cam arm being configured to engage with the first roller;

a second cam arm extending from the second extension in a downstream direction, the second cam arm being configured to engage with the second roller, wherein the poppet assembly is configured to move in a downstream direction into an open position, thereby moving the first roller along the first cam arm and the second roller along the second cam arm.

15. The check valve of claim 14, further comprising:

a first torsion spring acting on the first cam arm; and a second torsion spring acting on the second cam arm, wherein the first torsion spring is configured to bias the first cam arm in a first rotational direction, wherein the second torsion spring is configured to bias the second cam arm in a second rotational direction, and wherein the biases created by the first torsion spring and the second torsion spring are such that the engagement of the first cam arm with the first roller and the engagement between the second cam arm with the second roller are configured to urge the poppet assembly in the upstream direction.

16. The check valve of claim 15, wherein the first rotational direction is the opposite of the second rotational direction.

17. The check valve of claim 15 further comprising:

a first shaft; and a second shaft, wherein the first shaft extends from the first extension, and the first cam arm is configured to rotate about the first shaft, wherein the second shaft extends from the second extension, and the second cam arm is configured to rotate about the second shaft, wherein the first torsion spring is disposed at least partially around the first shaft, and wherein the second torsion spring is disposed at least partially around the second shaft.

18. The check valve of claim 14, wherein the first cam arm and the second cam arm both comprise a body having a first end and a second end, the bodies both defining elbows between the first ends and the second ends.

19. The check valve of claim 18, wherein the first roller is configured to be received within the elbow of the first cam arm, and the second roller is configured to be received within the elbow of the second cam arm.

20. The check valve of claim 18, wherein the first cam arm and the second cam arm both comprise a sloped surface extending from their respective elbows in a downstream direction, and wherein the sloped surfaces are angled relative to the longitudinal axis.

* * * * *